United States Patent [19]

Tashjian

[11] Patent Number: 5,367,309

[45] Date of Patent: Nov. 22, 1994

[54] CELLULAR PHONE SHIELD

[76] Inventor: Richard Tashjian, 700 Kinderkamack Rd., River Edge, N.J. 07661

[21] Appl. No.: 44,014

[22] Filed: Jul. 9, 1993

[51] Int. Cl.$^5$ .............................................. H01Q 1/24
[52] U.S. Cl. ..................................... 343/702; 455/89; 455/90; 455/117; 361/753; 361/816; 361/818; 343/841
[58] Field of Search .................. 455/33.1, 89, 90, 117, 455/347, 348, 351; 343/702, 845; 361/753, 816, 818; 174/35 R, 35 TS, 35 GC, 51; 379/428, 433, 437, 447, 450, 451

[56] References Cited

U.S. PATENT DOCUMENTS

| | | | |
|---|---|---|---|
| 5,124,889 | 6/1992 | Humbert et al. | 174/35 TS |
| 5,150,282 | 9/1992 | Tomura et al. | 361/818 X |
| 5,170,173 | 12/1992 | Krenz et al. | 343/702 |

OTHER PUBLICATIONS

"Cell Shield", Press Release, Mar. 1, 1993.
"Technical Solutions", All in Communications, Nov. 1993.

*Primary Examiner*—Edward F. Urban
*Attorney, Agent, or Firm*—Richard A. Joel

[57] ABSTRACT

A shielding device used on hand-held cellular phones comprises a substantially rectangular shield which extends adjacent to the antenna. A downwardly extending slide arm portion of the shield terminates in a substantially pointed end surface formed by the outer edge of the shield sloping inwardly to engage the inner edge of the slide arm, said outer edge having a notch on the exterior surface thereof. The device also includes a paddle arm portion extending perpendicular to the shield area and then downwardly to terminate in an enlarged paddle engaging the rear of the phone. The shield is mounted to a hand-held cellular phone with the shield area extending vertically upward adjacent to the antenna and the paddle arm extending over the top of the phone and terminating in the rear paddle and the paddle arm extending over the top of the phone. The shield is held in place by an O-ring which surrounds the phone and fits in the notch in the slide arm. The shield comprises polished aluminum while the slide arm and paddle arms are coated with plastic vinyl to enhance friction and prevent scratching of the phone surface. The shielding area deflects a majority of the radiation and simultaneously absorbs whatever is not deflected while physically blocking the user from actual contact with antenna when in use.

10 Claims, 4 Drawing Sheets

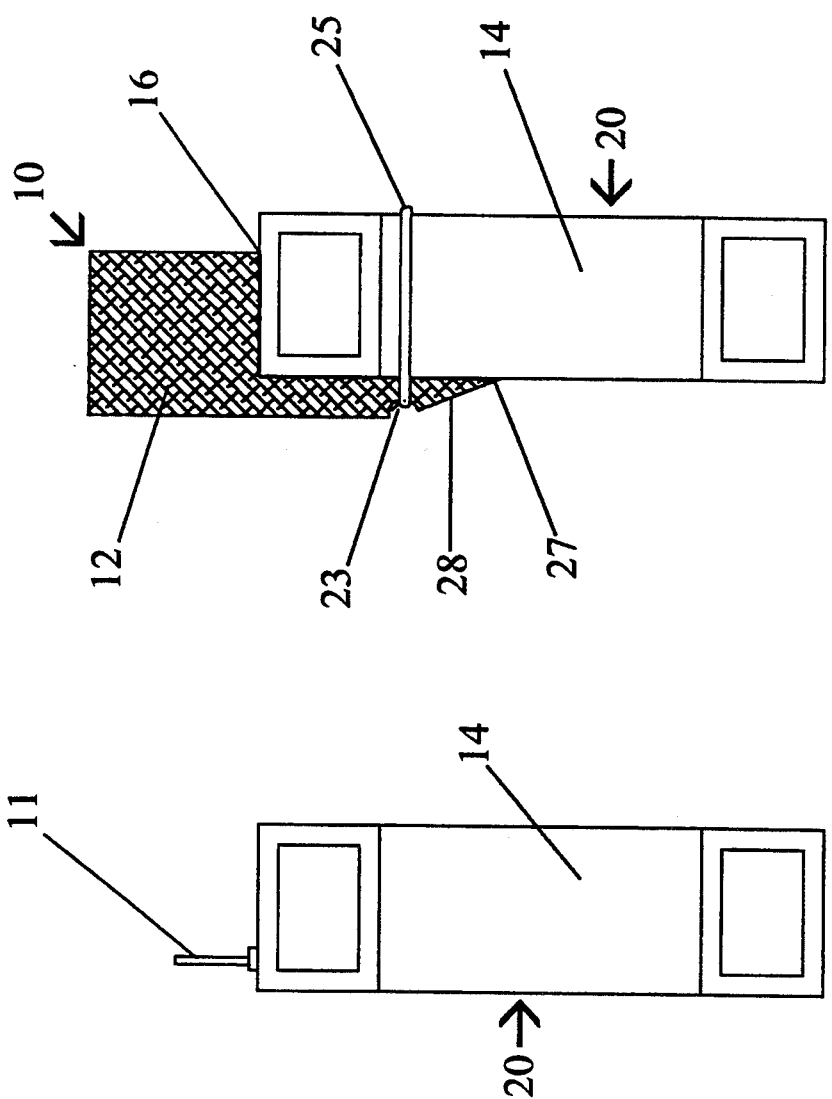

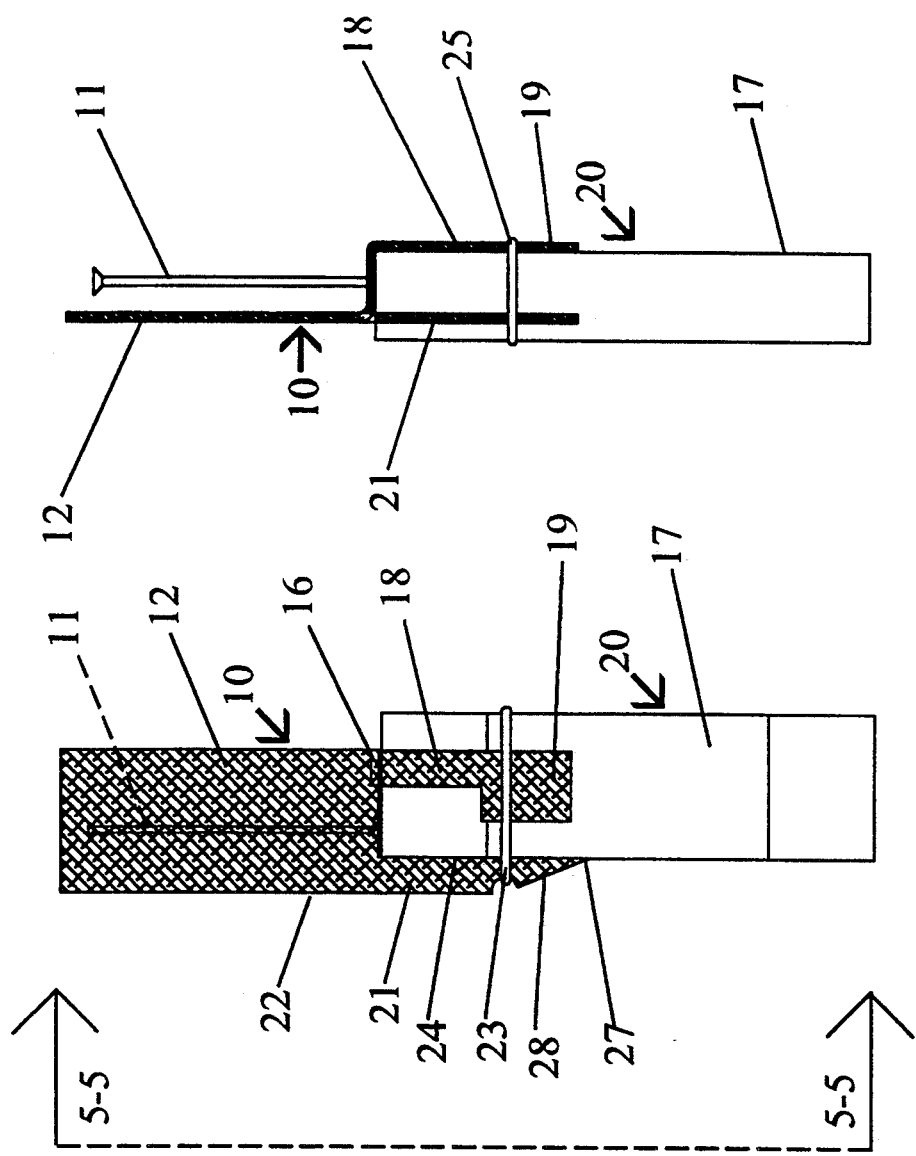

CELLULAR PHONE SHIELD

BACKGROUND OF THE INVENTION

The present invention addresses the concern over possible health hazards caused by the emission of microwave radiation from hand-held cellular phones. Cellular phones have greatly increased in numbers and popularity due to their convenience and flexibility as prices have come down. Major communications companies have entered the field in order to take advantage of the exploding market for cellular phones. The only problem which could dampen these expectations is the concern over health hazards.

The invention proposes a shielding device for cellular phones in order to shield the user from the microwave emissions from the antenna. Since the invention deflects the majority of the radiation, absorbs the remaining radiation which could contact the user and blocks physical contact with the antenna, any risks due to microwave radiation are substantially minimized or eliminated. Consequently, the cellular phone industry and user would be able to overcome the present "scare" due to potential radiation risks.

SUMMARY OF THE INVENTION

The present invention relates to a new and improved shielding device for hand-held cellular phones. The invention deflects the majority of microwave radiation emitted from the antenna away from the user and absorbs whatever is not deflected as heat. The shielding device also physically blocks any contact between the user and the invention.

The invention comprises a substantially rectangular shield portion which extends vertically upward from the top of a cellular phone adjacent to the antenna and a paddle arm portion which extends perpendicular to the base of the shield portion on one side thereof across the top of the phone and then downwardly in contact with the rear of the phone. The paddle arm widens at its lower end into an enlarged paddle which engages the rear of the phone for purposes of stabilization. A slide arm portion extends downwardly on the other side of the shield portion. This slide arm also acts as a shield when used on phones with side mounted antennas. The interior edge of the slide arm is parallel to the edge of the shield while the exterior edge includes a notch towards its lower end which then extends inwardly at an angle to contact the interior edge.

In use, the invention is mounted on a cellular phone with the shield portion extending adjacent the phone antenna approximately ¼" to ½" away, the paddle arm extending along the rear of the phone for stabilizing torsion and flexion/extension of the shielding device while the slide arm extends along one side of the phone to stabilize the shield from rotation. A flexible O-ring extends about the phone over the paddle and is locked in the slide arm notch to secure the shield in position.

Accordingly, an object of this invention is to provide a new and improved shielding device for hand-held cellular phones.

Another object of this invention is to provide a new and improved shielding device for hand-held cellular phones which fits most, if not all, such phones with minimum modifications.

A further object of this invention is to provide a shielding device for hand-held cellular phones which is readily mounted thereto and can be simply stored by reversing the position of the shield if so desired.

A more specific object of this invention is to provide a new and unique protective device for a cellular phone which comprises a shield of polished metal mounted adjacent to the antenna, downwardly extending portions which engage the phone and a flexible mounting which secures the downwardly extending portions to the phone.

BRIEF DESCRIPTION OF THE DRAWINGS

The above and other objects and advantages of the invention may be more clearly seen when viewed in conjunction with the accompanying drawings wherein:

FIG. 3a is a front view showing the cellular phone without the shield and FIG. 3b shows the shield mounted to a cellular phone;

FIG. 4 is a rear view of the shield mounted to a cellular phone;

FIG. 5 is a side view of the shield applied to a cellular phone taken along the lines 5—5 of FIG. 4.

DETAILED DESCRIPTION OF THE INVENTION

Figure 6:
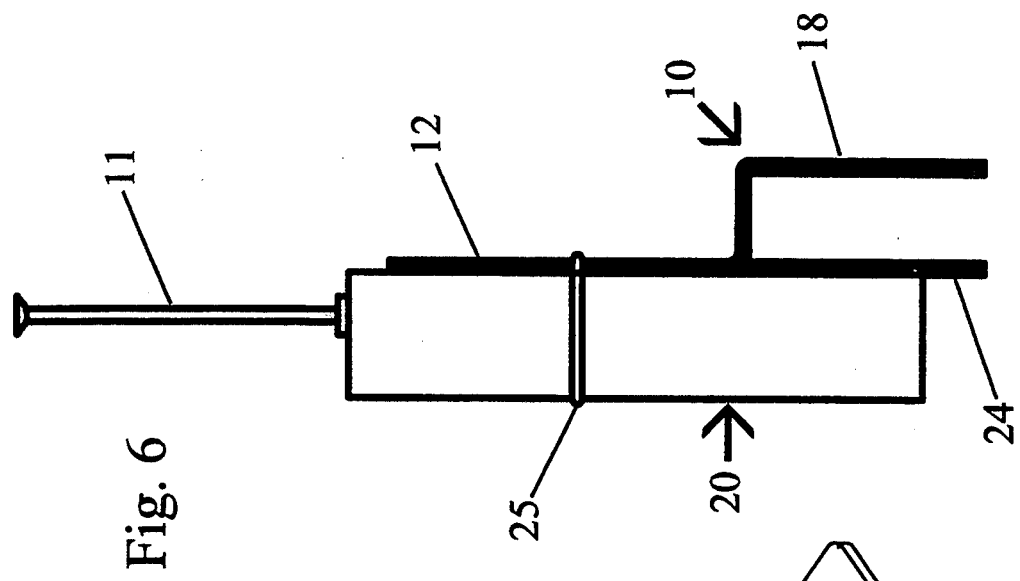
FIG. 6 illustrates the storage of the shield on the rear of the phone.
Figure 1:
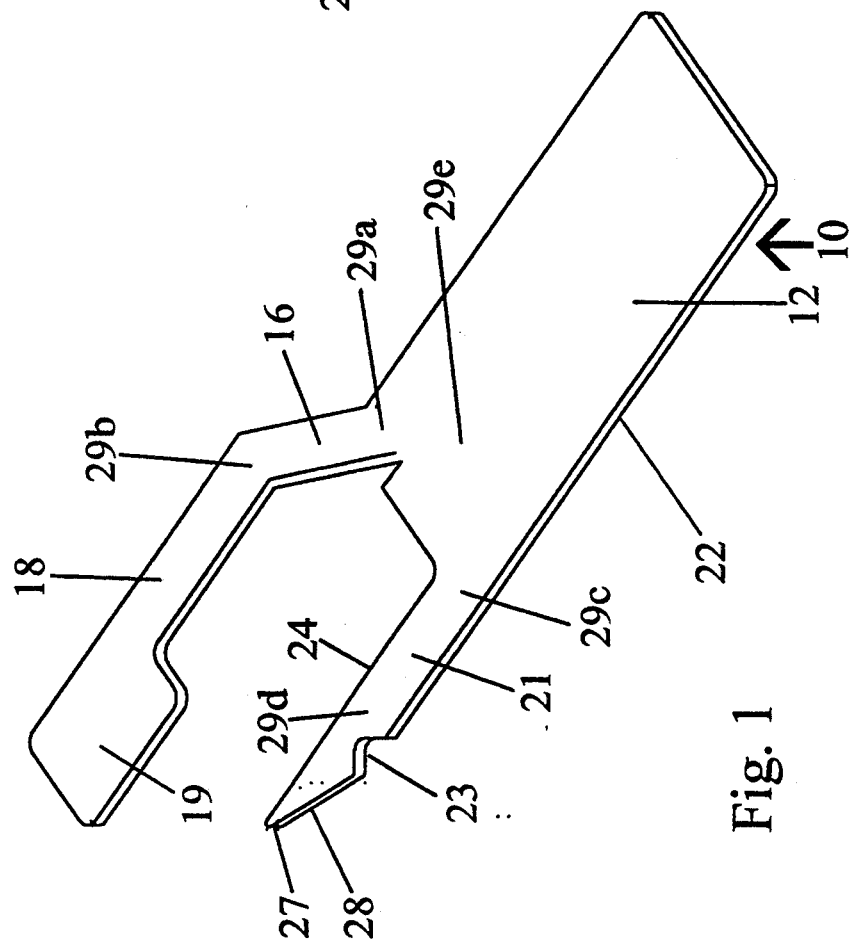
FIG. 1 is a perspective view of the invention.

Referring now to the drawings, the invention comprises a shielding device 10 for hand held cellular phones 20 which protects the user from microwave radiation emitted from the antenna 11. The shield 10 comprises an upper shield portion 12 of a substantially rectangular configuration which is mounted perpendicular to the top 13 of the phone 20 at the most effective distance from the antenna 11. The shield portion 12 which is preferably of 3/32" to ⅛" polished aluminum provides a barrier between the antenna 11 and the user on the front 14 of the phone 20. The majority of the radiation from the antenna 11 is thus deflected away from the user by the polished surface 12 while other radiation is absorbed as heat. The shield portion 12 also physically blocks any chance of contact with the antenna 11. As a further but unrelated advantage the surface 12 may be used as a mirror.

The invention further comprises an intermediate portion 16 which extends outwardly from the lower end of the shield portion 12 and along the top surface 13 of the phone 20 to the rear 17 thereof. The portion 16 extends downwardly along the rear 19 of the phone 20 as paddle arm 18 and terminates in an enlarged paddle area 19. The paddle arm 18 and paddle 19 stabilize torsion and flexion/extension of the shielding device 10 once it is mounted to the phone.

The shielding device 10 also includes a slide arm 21 which extends downwardly from the shield area 12 continuous with the outer edge 22 thereof and on the shield side opposite the paddle arm 18. The slide arm 21 extends downwardly to a notch 23 on the edge 22 and then extends inwardly at an angle to engage the interior edge 24 which is in contact with the side 26 of the phone 20. The junction 27 of edges 24 and 22 forms a point with a sloping outer edge 28 which facilitates mounting an O-ring 25 in the notch 23 to secure the device 10 to the phone 20. The slide arm 21 stabilizes the device 10 to prevent rotation.

Figure 2:
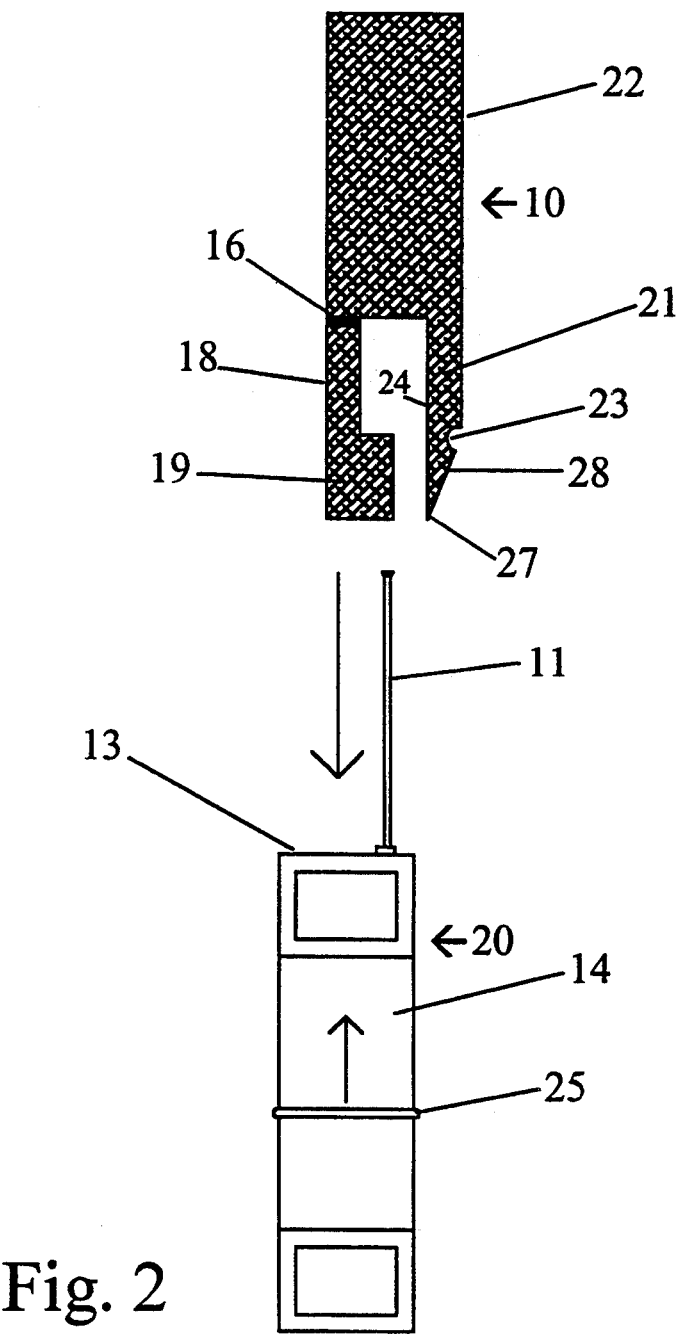
FIG. 2 is a front view showing the mounting of the shield to a cellular phone.

The device 10 is assembled to the cellular phone 20 in a rapid and expeditious manner as shown in FIG. 2. The device 10 is moved into position over the top 13 of the phone 20 until the intermediate portion 16 engages the top surface 13. The shield portion 12 is located approximately ¼ inch from the antenna 11 to obtain the optimum shielding benefit. The position of the shield area 12 minimizes the size needed and has the advantages of convenience and portability. The shield area 12 effectively shields just the area at risk while minimizing any loss in signal strength.

Once in position, the O-ring 25 is rolled upwardly about the phone 20 until it engages the notch 23. The slope 28 assists in leading the O-ring into the notch 23 where it is locked in place. The shield 10 is detached from the phone 20 by simply rolling the O-ring downwardly out of the slide arm notch 23 and off both arms 18 and 21. Once this is done, the shield device 10 is simply removed from the phone 20. Storage of the shield 10 can be accomplished by simply reversing the shield's position, placing it on the rear 17 of the phone 20 and then rolling up the O-ring 25 over the shielding area 12 to support its attachment to the phone 20.

The bottom portion of the device 10, that is, the slide arm 21 and paddle arm 18 portions, is coated with a plastic vinyl to enhance the appearance and increase friction. The vinyl coated portions 21 and 18 increase contact of the device 10 with the phone 20 which further decrease any chance of aberrant movement. The coating also decreases the chance of scratching the phone 20 when attaching and detaching the shielding device 10.

The shield's design will vary in height depending on the height of the antenna 11 it is shielding. Due to its unique design, the device 10 can be made to fit most if not all phones with minor modifications. These modifications would consist of bending the paddle arm 18 and if necessary the slide arm 21 in the five regions 29a, 29b, 29c, 29d and 29e resulting in different lengths and/or angles which would allow the shielding device 10 to be custom fitted to a particular phone model for optimum performance. If any signal deficiency is noted, the user can simply rotate the phone 20 in the direction from whence the signal is coming allowing for optimum performance in transmitting and receiving.

While the invention has been explained by a detailed description of certain specific embodiments, it is understood that various modifications and substitutions can be made in any of them within the scope of the appended claims which are intended also to include equivalents of such embodiments.

What is claimed is:

1. A shielding device to protect a user from microwave energy emitted from a hand-held cellular phone having a top surface, rear surface and an antenna extending upwardly from the top surface thereof comprising:

an upper shield portion extending upwardly from the top surface of the cellular phone adjacent to the antenna to form a barrier to deflect the energy from the antenna away from the user, an intermediate shield portion extending at an angle to the upwardly extending shield portion and along the top surface of the phone and then downwardly along the rear surface of the phone, terminating in an enlarged paddle area, a slide arm portion extending downwardly from the shield portion on one side thereof adjacent the paddle area side, said slide arm portion having an inner edge to engage the phone and an outer edge comprising a continuation of the shield portion, said slide arm outer edge having a notch and an inwardly sloping lower edge portion joining the slide arm inner edge, and an O-ring mounted about the phone and in engagement with the notch on the slide arm and about the paddle arm to maintain the shielding device in position.

2. A shielding device in accordance with claim 1 wherein:

the upper shield portion comprises a polished aluminum surface to deflect radiation from the antenna away from the user and to absorb the remaining radiation.

3. A shielding device in accordance with claim 2 wherein:

the slide arm portion, the intermediate shield portion, and the paddle portions are coated with a vinyl plastic to enhance friction and prevent marring of the phone surface.

4. A shielding device in accordance with claim 1 wherein:

the upper shield portion extends vertically upward from the top surface of the phone at a distance of approximately ¼ inch from the antenna.

5. A shielding device in accordance with claim 4 wherein:

the intermediate shield portion comprises a paddle arm along one side of the shield portion extending perpendicular to the vertical shield portion along the top surface of the phone and then downwardly in engagement with the phone and terminates in an enlarged portion.

6. A shielding device in accordance with claim 1 wherein:

the slide arm projects outwardly from the phone to shield the user from energy emitted from side mounted antennas.

7. A shielding device in accordance with claim 1 wherein:

the slide arm portion and the intermediate shield portion including areas which may be bent to accomodate different phones.

8. A shielding device in accordance with claim 1 wherein:

the shielding device may be reversed and secured to the phone for storage utilizing the O-ring.

9. A shielding device in accordance with claim 1 wherein:

the intermediate shield portion comprises a downwardly extending portion which engages the rear of the phone to stabilize torsion of the device and flexion, and, the slide arm engages the side of the phone to prevent rotation.

10. A shielding device in accordance with claim 1 wherein:

the upper shield portion extends upwardly physically blocking the user from contacting the antenna.

* * * * *